(12) United States Patent
Cheng et al.

(10) Patent No.: US 9,703,068 B2
(45) Date of Patent: Jul. 11, 2017

(54) LENS MOVING APPARATUS

(71) Applicant: Hong Kong Applied Science and Technology Research Institute Co. Ltd., New Territories (CN)

(72) Inventors: Kwok Sing Cheng, New Terrotories (HK); Kin Ming Fan, Ngau Tau Kwok (HK)

(73) Assignee: Hong Kong Applied Science and Technology Research Institute, Co., Ltd., Shatin (HK)

( * ) Notice: Subject to any disclaimer, the term of this patent is extended or adjusted under 35 U.S.C. 154(b) by 484 days.

(21) Appl. No.: 14/038,380

(22) Filed: Sep. 26, 2013

(65) Prior Publication Data

US 2014/0313582 A1     Oct. 23, 2014

Related U.S. Application Data

(60) Provisional application No. 61/814,121, filed on Apr. 19, 2013.

(51) Int. Cl.
*G02B 27/64* (2006.01)
*G02B 7/09* (2006.01)
*G02B 7/08* (2006.01)

(52) U.S. Cl.
CPC .............. *G02B 7/09* (2013.01); *G02B 7/08* (2013.01); *G02B 27/646* (2013.01)

(58) Field of Classification Search
CPC .......... G02B 27/64–27/648; G03B 5/00–5/08; G03B 2205/00–2205/0092; H04N 5/232–5/23296

USPC ................ 359/554–557; 396/52–55, 73, 75; 348/208
See application file for complete search history.

(56) References Cited

U.S. PATENT DOCUMENTS

| | | | |
|---|---|---|---|
| 7,725,014 B2 | 5/2010 | Lam et al. | |
| 8,224,169 B2 | 7/2012 | Tsuruta et al. | |
| 8,300,105 B2* | 10/2012 | Byon | H04N 5/23248 348/208.7 |
| 8,670,195 B2 | 3/2014 | Ikushima et al. | |
| 2006/0028320 A1* | 2/2006 | Osaka | G02B 7/08 340/384.1 |
| 2006/0115259 A1* | 6/2006 | Ito | H02K 1/145 396/75 |
| 2007/0297781 A1* | 12/2007 | Kitano | G02B 27/646 396/55 |

(Continued)

FOREIGN PATENT DOCUMENTS

| | | |
|---|---|---|
| CN | 101685235 A | 3/2010 |
| CN | 103454750 | 12/2013 |

(Continued)

OTHER PUBLICATIONS

PCT/CN2014/075703 / 201410278JYC: International search report and written opinion, Jul. 1, 2014, 18 pages.

(Continued)

*Primary Examiner* — Bumsuk Won
*Assistant Examiner* — Jeffrey Madonna
(74) *Attorney, Agent, or Firm* — Berkeley Law & Technology Group, LLP (57) ABSTRACT

The subject matter disclosed herein relates to an imaging module comprising an electromagnetic actuator to provide focus-related and image stabilization-related functionality.

15 Claims, 7 Drawing Sheets

(56) References Cited

U.S. PATENT DOCUMENTS

| | | | |
|---|---|---|---|
| 2010/0182696 A1* | 7/2010 | Hasegawa | G02B 27/646 359/557 |
| 2011/0001836 A1* | 1/2011 | Chiang | G02B 27/646 348/208.99 |
| 2011/0097062 A1 | 4/2011 | Tsuruta et al. | |
| 2011/0286099 A1 | 11/2011 | Shiraki et al. | |
| 2012/0027391 A1* | 2/2012 | Okamura | H04N 5/23287 396/55 |
| 2012/0154614 A1* | 6/2012 | Moriya | G03B 3/10 348/208.5 |
| 2012/0287517 A1* | 11/2012 | Terajima | H02K 41/0356 359/824 |
| 2012/0314307 A1 | 12/2012 | Ikushima et al. | |
| 2012/0314308 A1 | 12/2012 | Ikushima et al. | |
| 2013/0089311 A1 | 4/2013 | Jung et al. | |
| 2013/0163085 A1* | 6/2013 | Lim | H02K 41/0356 359/557 |
| 2013/0170052 A1* | 7/2013 | Yu | G02B 27/646 359/813 |
| 2013/0176629 A1* | 7/2013 | Nakayama | G02B 15/14 359/696 |
| 2014/0072289 A1* | 3/2014 | Lim | G03B 13/36 396/55 |
| 2014/0355118 A1* | 12/2014 | Park | G02B 27/646 359/557 |

FOREIGN PATENT DOCUMENTS

| | | |
|---|---|---|
| JP | 2011085666 A | 4/2011 |
| KR | 20120097117 A | 9/2012 |

OTHER PUBLICATIONS

PCT/CN2014/075703 / 201410278JYC: Application as filed Apr. 19, 2013, 30 pages.
PCT/CN2014/075703 / 201410278JYC: Initial Publication, Oct. 23, 2014, 32 pages.
PCT/CN2014/075703 / 201410278JYC: International Report on Patentability, Oct. 20, 2015, 8 pages.
U.S. Appl. No. 14/883,456, filed Oct. 14, 2015, 61 pages.
U.S. Appl. No. 14/883,456: Notice to File Missing Parts, Oct. 28, 2015, 2 pages.
U.S. Appl. No. 14/883,456: Filing Receipt, Oct. 28, 2015, 3 pages.
U.S. Appl. No. 14/883,456: Applicant Respons to Pre-Exam Formalities Notice, Nov. 4, 2015, 9 pages.
U.S. Appl. No. 14/883,456: Filing Receipt, Nov. 10, 2015, 3 pages.

* cited by examiner

LENS MOVING APPARATUS

CROSS REFERENCE TO RELATED APPLICATIONS

The present application is related to, and claims priority from, U.S. Provisional Pat. Appl. No. 61/814,121, filed on Apr. 19, 2013, and titled NOVEL LENS MOVING APPARATUS, which is hereby incorporated by reference.

FIELD

The subject matter disclosed herein relates to an imaging module capable of having at least one lens assembly and comprising an electromagnetic actuator to adjust a focus of the imaging module and/or perform image stabilization.

BACKGROUND

Many portable electronic apparatuses, including but not limited to handheld devices such as cellular phones, tablets, and/or a personal digital assistant (PDA) for example, may comprise a compact camera or imaging module. Such a module may comprise an image sensor, an imaging lens assembly, and/or an actuator to adjust the position of the imaging lens assembly with respect to the image sensor and/or provide image stabilization. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIGS. 5A-BC illustrate different portions of an imaging module.

FIGS. 7A-7E illustrate different portions of an imaging module according to one embodiment.

FIGS. 8A-8D illustrate different portions of an imaging module according to one embodiment.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis.

Figure 1:
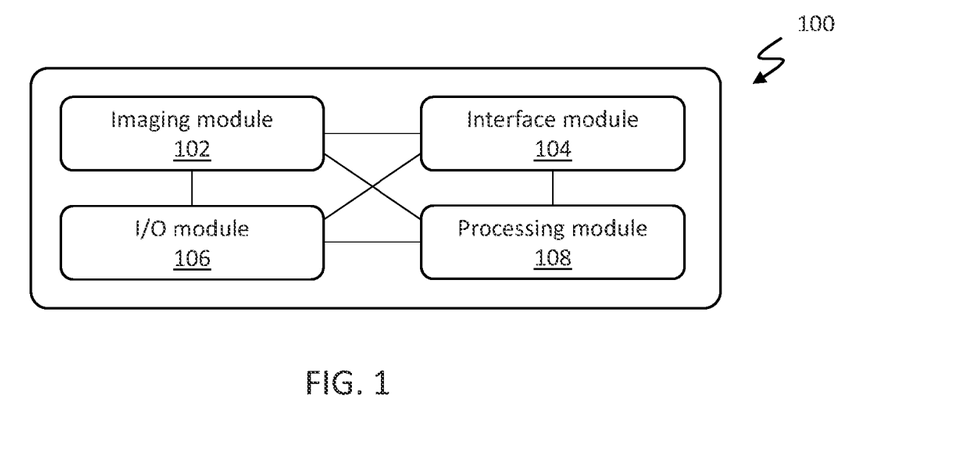
FIG. 1 is a block diagram illustrating a device, according to an embodiment.

Embodiments described herein include an imaging module that provides a mechanism and/or allows a process to adjust a focal ratio between the one or more individual lens assemblies and one or more image sensors, and/or facilitate image stabilization. FIG. 1 is a block diagram illustrating a device 100 according to one embodiment. Device 100 may comprise any kind or form of device, including, for example, electronic devices such as handheld devices like phones, tablets, and PDAs, cameras, computers, among other things. Device 100 may comprise a plurality of modules related to the operation and/or function thereof. The plurality of modules may comprise hardware, software, and/or a combination thereof. In one embodiment, device 100 may comprise an imaging module 102, an interface module 104, an I/O module 106, and a processing module 108, among other things. Imaging module 102, interface module 104, I/O module 106, and processing module 108 may be communicably coupled together so as to facilitate the transmission and reception of data to and from any one given module.

Imaging module 102 may comprise any suitable module related to imaging. For instance, imaging module 102 may comprise a combination of hardware and/or software in order to facilitate the capture of images of a given scene. For instance, in one embodiment, imaging module 102 may be a component of a camera module of a handheld device.

Interface module 104 may comprise any suitable module relating to an interface with users, devices, and/or other modules of device 100. For instance, interface module 104 may comprise a combination of hardware and/or software capable of facilitating an interface to allow interaction with a user. In one embodiment, interface module 104 may transmit and receive data related to a graphical user interface with which a user may interact. In another embodiment, interface module 104 may facilitate communication with a device external to device 100. For instance, interface module 104 may transmit and/or receive communications related to a device external to device 100.

I/O module 106 may comprise any suitable module relating to the input/output of a device. For instance, I/O module 106 may comprise a combination of hardware and/or software and facilitate functionality relating to the input and output functionality of device 100.

Processing module 108 may comprise any suitable module related to processing and/or computation of device 100. For instance, in one embodiment, processing module 108 may comprise a processor configured to transmit and receive data and perform different processes related thereto. For instance, processing module 108 may be capable of receiving instructions related to functionality of a module of device 100 and may facilitate the implementation thereof.

In operation, according to one embodiment of device 100, imaging module 102, interface module 104, I/O module 106, and processing module 108 may exchange data as part of the operation of device 100. For instance, a user may attempt to interact with an element of device 100. The user interaction may be represented by a signal. In one embodiment, the signal may originate in I/O module 106. An additional signal related to instructions may be transmitted to processing module 108. In one example, the user interaction may be related to the operation of imaging module 102, such as instructing that imaging module 102 be initialized in preparation of capturing an image. Imaging module 102 may capture an image and may transmit a plurality of signals relating to the same to processing module 108, I/O module 106, and/or interface module 104, among other things. In one example embodiment, the signals related to the captured image may be stored in a memory of device 100 that may comprise a non-transitory computer readable storage medium. The foregoing presents an exemplary description of one possible operation of device 100 and is not to be taken in a restrictive sense.

Figure 2:
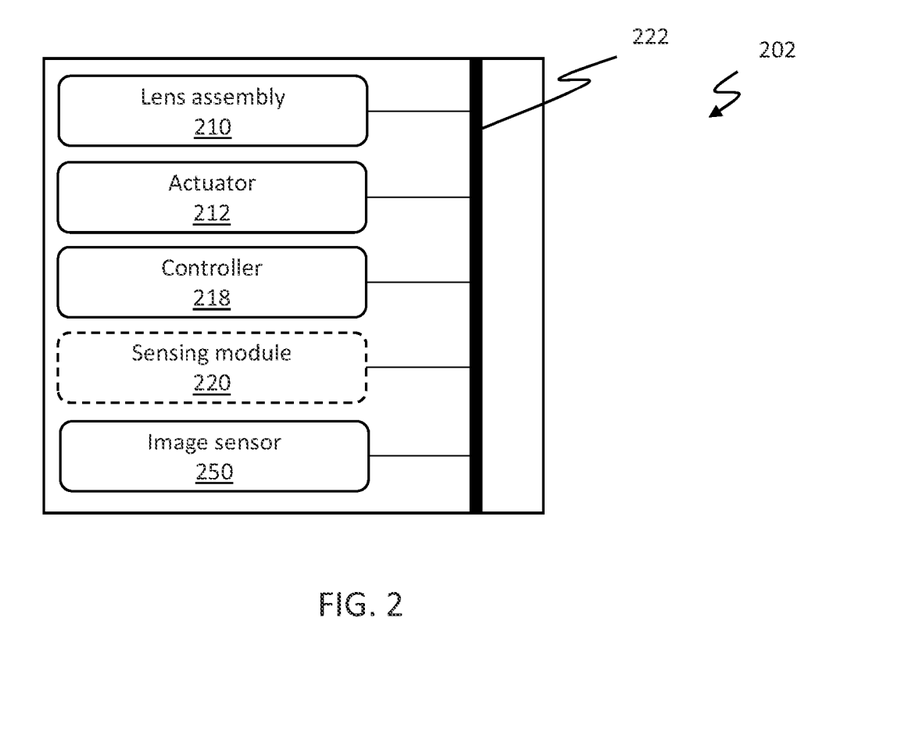
FIG. 2 is a block diagram illustrating an imaging module, according to an embodiment.

FIG. 2 is a block diagram of imaging module 202 according to one embodiment. FIG. 2 illustrates the communicative coupling of different parts of imaging module 202 and is not intended to be interpreted as a literal description of the physical structure of imaging module 202. In this example, imaging module 202 may comprise a combination of hardware and software including, but not limited to, a lens assembly 210, an actuator 212, a controller 218, sensing module 220, and image sensor 250. Imaging module 202 may comprise a bus 222 configured to facilitate the transmission and reception of data between modules of imaging module 202 and/or external modules and devices, among other things. These and other modules that may make up imaging module 202 may comprise any combination of hardware, software, and/or combination thereof.

Lens assembly 210 may comprise a combination of structure, such as glass, plastic, and/or metal, among other things, in order to form an element configured to receive and transmit electromagnetic radiation that, in at least one embodiment, may comprise visible light. Of course, lens assembly 210 may comprise other structures and functionality. In one embodiment, lens assembly 210 may comprise one or more lens elements (not shown) that may operate in concert to refract light. Imaging module 202 may comprise a plurality of lens assemblies 210 in certain embodiments.

Actuator 212 may comprise any suitable form of actuator capable of moving lens assembly 210 relative to image sensor 250, or vice versa. In one embodiment, actuator 212 may comprise an electromagnetic actuator comprising at least one magnet and at least one coil that may interact with each other via, among other things, electromagnetic forces. The electromagnetic actuator may be capable of inducing movement of lens assembly 210 in one or more directions and/or inducing rotation of lens assembly 210 about one or more axes. The electromagnetic actuator may comprise a magnet and coil actuator and a voice coil motor (VCM), among other things. Of course, other forms of actuator 212 are contemplated by the present disclosure including, but not limited to electromechanical and piezotube-related actuators.

Controller 218 may comprise hardware, software, and any suitable combination thereof. Controller 218 may comprise a module capable of altering characteristics related to lens assembly 210 including, but not limited to, exposure time, f-stop numbers, focal length and ratios, and lens distortion mapping, among other things. For instance, in one embodiment, controller 218 may be capable of determining a distance to an object, a focal length of a lens, and may facilitate lens height adjustment accordingly. Controller 218 may also be capable of providing movement and rotation control for imaging module 202. For instance, controller 218 may be capable of controlling the tilt of lens assembly 210 about at least two axes. In some examples, controller 218 may be integrated into the same chip as one or more image sensors 250. Of course, the preceding and other functionality contemplated for controller 218 may be performed any element or part, and controller 218 may be considered more generally as a symbolic representation of hardware and software configured to contribute to the operation of imaging module 202.

Optional sensing module 220 may comprise any hardware, software, and any combination thereof capable of sensing a position of a lens assembly 210 relative to, for example, an image sensor 250. In one embodiment, sensing module 220 may comprise an element configured to sense a position of lens assembly 210 based on a strength of a magnetic field, for instance. Alternative embodiments may include sensors configured to sense a current or a resistance, among other things. Of course, any other suitable means or mechanism is contemplated under the present disclosure.

Bus 222 may be capable of transmitting and receiving data to and from lens assembly 210, actuator 212, controller 218, sensing module 220, image sensor 250, and devices and modules external to imaging module 202.

In operation, signals may be received at imaging module 202 via bus 222 and may be directed to the appropriate module. Signals may also be transmitted from imaging module 202 via bus 222. Signals may be received and transmitted among modules of imaging module 202 via bus 222.

Figure 3:
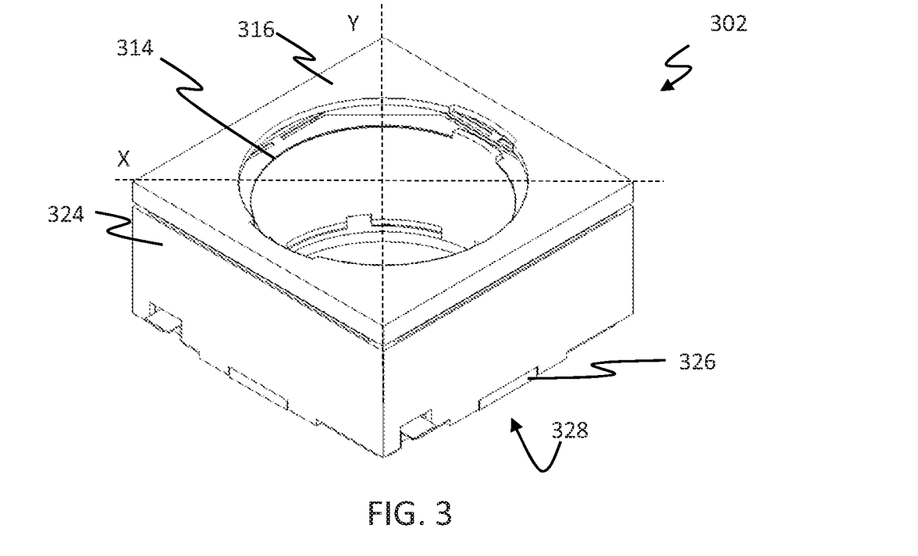
FIG. 3 is a perspective view of an imaging module according to an embodiment.

FIG. 3 is a perspective view of an imaging module 302 according to one embodiment. Imaging module 302 may comprise a lens holder 314 arranged within an upper casing 316 and a yoke 324. Imaging module 302 may comprise a lens assembly (not shown) configured to facilitate the capture of images. The lens assembly may be connected to lens holder 314. In one embodiment, the lens assembly may be integrated into lens holder 314. Lens holder 314 may be connected to a base 326. In one embodiment, a controller 328 may be connected to base 326. In addition to controller 328, an electric circuit and a power source (not shown) may be provided to facilitate actuator control. Imaging module 302 may comprise an image sensor (not shown) configured to collect refracted light, among other things. In one embodiment, the lens holder 314 and the lens assembly may define an optical axis perpendicular to X- and Y-axes illustrated in FIG. 3. It is to be understood that the X- and Y-axes illustrated in FIG. 3 are included to facilitate understanding of the following discussion, and are not to be understood to be components of the physical structure of imaging module 302.

In operation lens holder 314 may be configured to move along an optical axis defined by a lens assembly of lens holder 314. Movement of the lens holder 314 may be induced by an electromagnetic actuator. For instance, a current signal may lead to one or more electromagnetic forces relative to the electromagnetic actuator, and may induce movement of lens holder 314. In one example, the electromagnetic actuator may comprise one or more magnets connected to yoke 324, and one or more coils connected to lens holder 314. The electromagnetic actuator may be capable of inducing movement of lens holder 314 along at least one axis, and further inducing rotation of lens holder 314 about two or more other axes. For instance, the one or more electromagnetic forces may induce movement of the one or more coils connected to lens holder 314 relative to the one or more magnets. Movement of lens holder 314 may adjust a distance between a lens assembly in lens holder 314 and an image sensor arranged to receive refracted light from the lens assembly. For example, lens holder 314 may move relative to the image sensor to focus light on the image sensor, among other things. Imaging module 302 may also comprise a spring mechanism connected to lens module 314 configured to assist lens holder 314 return back to a resting or neutral position. The spring mechanism may comprise an upper and a lower spring. For example, each of the lower spring and the upper spring may comprise a coil spring, having a diameter larger than the diameter of lens holder 314. The lower spring and the upper spring may also comprise a leaf spring, or one or more leaf springs arranged proximate to the respective ends of lens holder 314. The upper and lower springs may also be positioned in different locations. For example, both may be located proximate to each other at one end of lens holder 314.

Further, lens holder 314 may be capable of rotating about other axes. For example, lens holder 314 may rotate about the Y-axis illustrated in FIG. 3 in response to a current signal to an electromagnetic actuator. In another example, lens holder 314 may rotate about the X-axis illustrated in FIG. 3 in response to a current signal to an electromagnetic actuator. In one embodiment, one or more current signals may be sent to an electromagnetic actuator and may induce rotation of lens holder 314 about the X- and/or the Y-axis. Rotational movement of lens holder 314 about the X- and/or Y-axis may facilitate functionality related to image stabilization, among other things.

Figure 4:
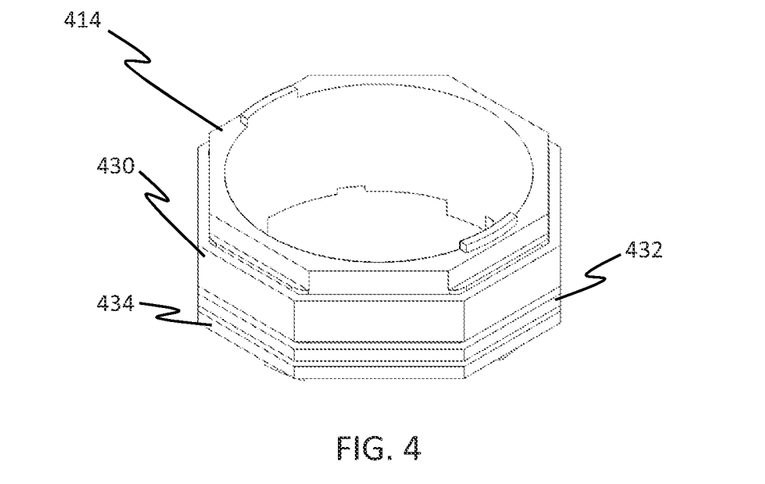
FIG. 4 is a perspective view of a lens holder according to an embodiment.

FIG. 4 is a perspective view of a lens holder 414. Lens holder 414 may be connected to a lens assembly (not shown). FIG. 4 illustrates one embodiment of an electromagnetic actuator comprising a first coil 430, a second coil 432, and a third coil 434. First, second, and third coils 430, 432, and 434 may be connected to an exterior surface of lens holder 414. First, second, and third coils 430, 432, and 434 may be arranged proximate to one or more magnets of the electromagnetic actuator. As used herein, a coil may be proximate to a magnet if each is arranged within an electromagnetic and/or magnetic field of the other. First, second, and third coils 430, 432, and 434 may be arranged concentrically on lens holder 414 such that the center of each of first, second, and third coils 430, 432, and 434 lies on the optical axis of lens holder 414.

In operation, a current signal may be transmitted to first coil 430. The provided current may induce the creation of an electromagnetic field between first coil 430 and one or more magnets of the electromagnetic actuator. The induced electromagnetic field may induce movement of lens holder 414 along an optical axis defined by lens holder 414. A current may be transmitted to second coil 432. The provided current may induce the creation of an electromagnetic field between second coil 432 and one or more magnets of the electromagnetic actuator. The induced electromagnetic field may induce rotation of lens holder 414 about an axis perpendicular to the optical axis. A current may be transmitted to a third coil 434. The provided current may induce the creation of an electromagnetic field between third coil 434 and one or more magnets of the electromagnetic actuator. The induced electromagnetic field may induce rotation of lens holder 414 about an axis perpendicular to the optical axis.

The electromagnetic actuator may comprise portions configured to operate independently and/or may be electrically connected in series, depending on the kind of control that is required. According to one embodiment, for motion control, second coil 432 and third coil 434 may be connected independently such that electric current flowing through second coil 432 may be independent of any current flowing through third coil 434 so as to, among other things, permit independent rotational movement of lens holder 414 around different axes. This independent movement may allow for precise control over different functionality, such as, for example, autofocus functionality and image stabilization functionality, among other things. In one embodiment, the autofocus and image stabilization functionality may operate independently or in combination, as desired. In another embodiment, control of the autofocus functionality and control of the image stabilization functionality may be provided independently, depending on the requirements of the particular application In one embodiment, first, second, and third coils 430, 432, and 434 may comprise electrically conductive material. Certain components of imaging module 302, such as the casing and lens holder 414, may comprise non-magnetic materials such as plastics or non-magnetic metal alloys, so as not to interfere with the magnetic fields of the coils and the magnets, among other things.

Figures 5A, 5B, 5C:
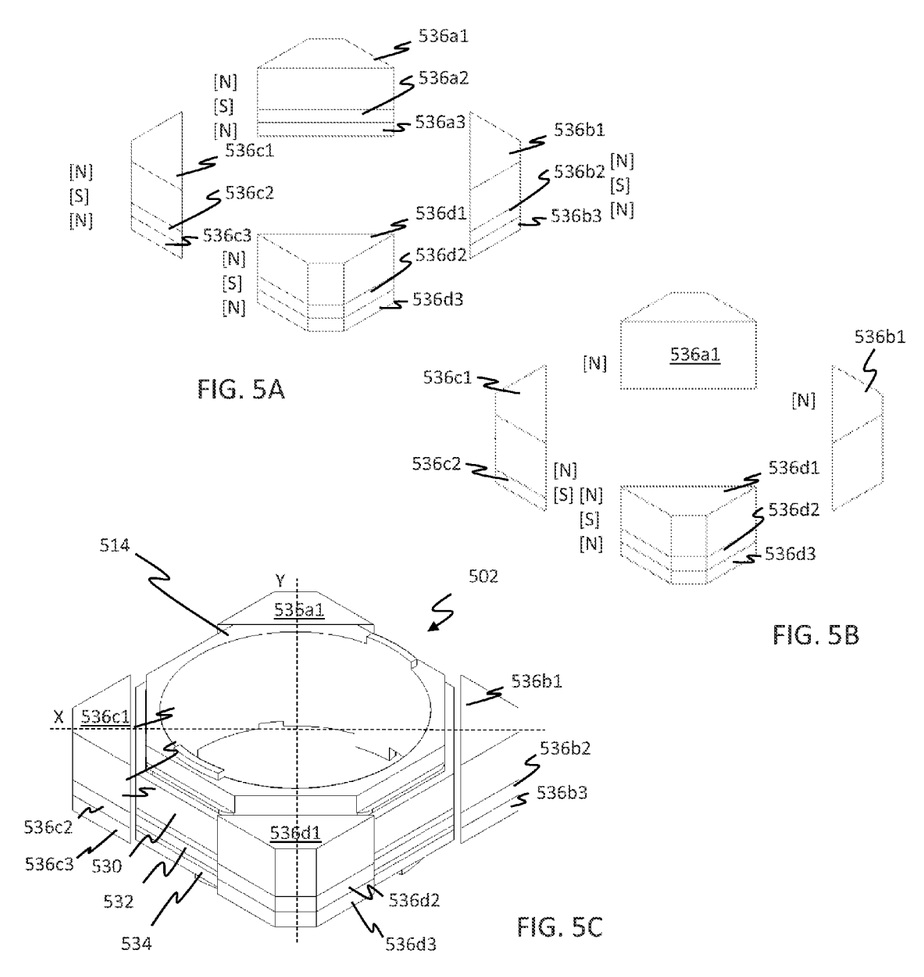
FIG. 5A illustrates an arrangement of a plurality of magnets according to one embodiment.
FIG. 5B illustrates an arrangement of a plurality of magnets according to another embodiment.
FIG. 5C is a perspective view of an imaging module according to one embodiment.

FIGS. 5A-5C illustrate different portions and embodiments of an imaging module 502. FIG. 5A illustrates one set of a plurality of magnets of an electromagnetic actuator of imaging module 502. In this embodiment, twelve magnets may be arranged in proximity to one or more coils to facilitate movement and/or rotation of lens holder 514. For example, magnets 536*a*1, 536*b*, 536*c*1, and 536*d* may be arranged in proximity to first coil 530, magnets 536*a*2, 536*b*2, 536*c*2, and 536*d*2 may be arranged in proximity to second coil 532, and magnets 536*a*3, 536*b*3, 536*c*3, and 536*d*3 may be arranged in proximity to a third coil 534. As illustrated in FIG. 5A, a surface of magnets 536*a*1-3, 536*b*1-3, 536*c*1-3, and 536*d*1-3 may comprise a polarity. As used herein, the polarity of the face of each respective magnet facing coils 530, 532, and/or 534 will be illustrated with either [N] or [S] to indicate either a north or south polarity. Thus, for example, the face of magnets 536*a*1 facing first coil 530 comprises a polarity 'N'. As one of ordinary skill in the art would appreciate, the polarities listed in FIG. 5A are intended to illustrate operation, but are not to be understood in a restrictive sense. Indeed, any number of polarities and arrangements of magnets and coils is contemplated by the present disclosure.

FIG. 5B illustrates an alternative embodiment of magnets of an electromagnetic actuator of an imaging module 502. This embodiment comprises magnets 536*a*1, 536*b*, 536*c*1, and 536*d*, which may be arranged in proximity to first coil 530; magnets 536*c*2 and 536*d*2, which may be arranged in proximity to second coil 532; and a magnet 536*d*3, which may be arranged in proximity to a third coil.

FIG. 5C illustrates one embodiment of an imaging module 502 wherein the magnets (536*a*1 to 536*d*3) are arranged around lens holder 514 and first, second, and third coils 530, 532, and 534. In operation, current may be provided to first coil 530, which may induce the formation of an electromagnetic force between first coil 530 and at least magnets 536*a*1, 536*b*1, 536*c*1, 536*d*1, which electromagnetic force may induce movement of lens holder 514 along, or parallel to, an optical axis defined by a lens assembly and lens holder 514. For example, the current signal may induce a combination of electromagnetic forces, including, for example, attractive and repulsive forces, of the electromagnetic actuator, which may be sufficient to induce movement of lens holder 514.

A further current may be provided to second coil 532, which may induce the formation of an electromagnetic force between second coil 532 and at least magnets 536*a*2, 536*b*2, 536*c*2, and 536*d*2. The formed electromagnetic force may induce rotational movement of lens holder 514 about an axis perpendicular or orthogonal to the optical axis. For instance, in one example, the provided current may induce rotation of lens holder 514 such that lens holder 514 tilts about an axis. The current provided to second coil 532 may be independent of any current provided to either first or third coils 530 and 534.

Yet a further current may be provided to third coil 534, which may induce the formation of an electromagnetic force between third coil 534 and at least magnets 536*a*3, 536*b*3, 536*c*3, and 536*d*3. The formed electromagnetic force may induce rotational movement of lens holder 514 about an axis perpendicular or orthogonal to the optical axis and, in one embodiment, the rotational axis related to second coil 532. The movement and/or rotation of lens holder 514 may correspond to focus and/or image stabilization functionality.

It is to be understood by the foregoing description that each of first, second, and third coils 530, 532, and 534 may receive a current signal that induces rotational movement of lens holder 514 independent of each other coil. For example, in one embodiment, one or more current signals may be transmitted to first coil 530 which may be related to autofocus functionality of imaging module 502. Thus, first coil 530 may be referred to as an autofocus coil. In this example, the current signal to first coil 530 may be independent of any current signals to second and third coils 532 and 534. For instance, first coil 530 may receive a current signal while second and third coils 532 and 534 do not receive any current signals. Additionally, in one embodiment, imaging module 502 supports receiving current signals of different magnitudes and/or polarities at each of first, second, and third coils 530, 532, and 534. For example, it may be desirable to receive a current signal of $A_1$ at first coil 530, while concurrently receiving current signals of $A_2$ at second coil 532 and $A_3$ at third coil 534. Thus, for example, if there is a desire to use autofocus functionality of imaging module 502, a current signal of $A_1$ may be transmitted to first coil 530, which may induce a movement of lens holder 514 along an optical axis of lens holder 514. In one example, there may be a desire to use image stabilization functionality of imaging module 502 concurrently with the use of autofocus functionality thereof, and current signals of $A_2$ and $A_3$ may be transmitted to second and third coils 532 and 534, respectively, which may induce rotation of lens holder 514 about axes perpendicular or orthogonal to the optical axis.

In yet other examples, a plurality of current signals may be transmitted to any one of the first, second, and third coils 530, 532, and 534. For instance, in one embodiment, inducing movement and/or rotation of lens holder 514 may be related to transmitting a first current signal $A_1$ to induce a first force, and subsequently transmitting a second current signal $A_2$ to induce a second force. In fact, any number, magnitude, polarity, and/or duration of current signals are contemplated by the presented disclosure.

In one embodiment, first, second, and/or third coils 530, 532, and 534 may be configured to induce differing electromagnetic fields at different portions of the coil. For instance, second coil 530 may comprise a first and a second portion and be capable of inducing a first electromagnetic field at the first portion in response to a current signal, while inducing a second electromagnetic field at the second portion. In one example implementation, a coil, such as second coil 532 may be capable of receiving a first current on a first portion and a second current on a second portion and thereby induce the creation of two electromagnetic fields. Of course, these are but illustrative examples and are not intended to be understood in a restrictive sense.

Figure 6A:
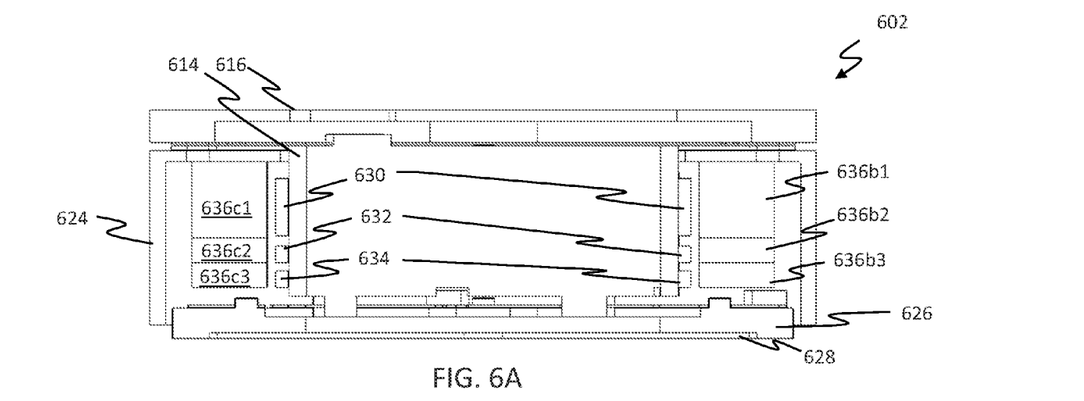
FIGS. 6A-6B are cross sections of an imaging module according to different embodiments.
Figure 6B:
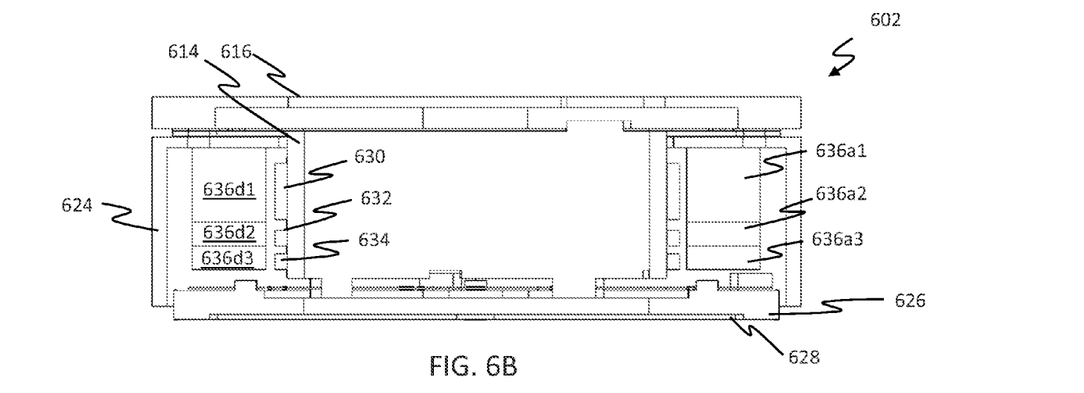

FIGS. 6A and 6B show cross sections of imaging module 602 as may be viewed if the imaging module 302 in FIG. 3 were divided along the x- and y-axes. As illustrated in FIGS. 6A and 6B, imaging module 602 comprises an upper casing 616, a yoke 624, and a base 626. Circuitry, such as, for example, a controller 628, may be integrated into base 626. Upper casing 616, yoke 624, and base 626 may comprise any suitable materials including, but not limited to, plastics and other lightweight synthetic materials.

Lens holder 614 may be arranged within upper casing 616, yoke 624, and base 626 of imaging module 602. In one embodiment, one or more springs (see FIGS. 9A-9C) to assist in providing functionality of imaging module 602. In one embodiment, a plurality of coils such as, for example, first coil 630, second coil 632, and third coil 634 may be attached to lens holder 614. The coils, such as first, second, and third coils 630, 632, and 634 may be arranged in concentric circles around an outer surface of lens holder 614. Alternatively, first, second, and third coils 630, 632, and 634 may be arranged at different positions around the exterior surface of lens holder 614 (see, e.g., FIG. 7A), among other things. In one embodiment, first coil 630 may be larger than second and third coils 632 and 634. For example, coils with different dimensions may be useful to facilitate movement of lens holder 614, such as, for example, to achieve autofocus functionality.

First, second, and third coils 630, 632, and 634 may be arranged in proximity to a plurality of permanent magnets. In one embodiment, magnets of imaging module 602 may be arranged in the corners of yoke 624. Thus, for example, each coil may be in proximity to one or more magnets. For example, first coil 630 may be arranged in proximity to magnets 636a1, 636b1, 636c1, and 636d1, as illustrated in FIGS. 6A and 6B. Portions of magnets 636a1, 636b1, 636c1, and 636d1 facing first coil 630 may comprise a polarity. Further, each of second and third coils 632 and 634 may also be arranged in proximity to one or more magnets.

In operation, first coil 630 may receive one or more current signals. In response to the received one or more current signals, an electromagnetic field may be induced about first coil 630. The induced electromagnetic field may interact with a magnetic field of one or more magnets such as, for example, 636a1, 636b1, 636c1, and 636d1. The induced electromagnetic field may therefore induce one or more forces, such as, for example, an attractive and/or repulsive magnetic force. For example, in response to the provided current, an attractive and/or repulsive force may induce movement of lens holder 614. In one case, the induced one or more forces may be such as to propel lens holder 614 along an optical axis defined by lens holder. For example, lens holder 614 may move vertically up or down, as arbitrarily shown in FIGS. 6A and 6B, an optical axis of lens holder 614. In this example, the movement of lens holder 614 may be useful for changing a focal length or focal ratio, among other things. Such principles of operation may be useful for focus-related functionality such as, for example, autofocus functionality, of an imaging module 612, among other things.

Independent of any current signals received by first coil 630, second coil 632 may receive one or more current signals. In response to the received one or more current signals, an electromagnetic field may lead to one or more forces between second coil 632 and one or more magnets such as, for example, magnets 632a2, 632b2, 632c2, and 632d2. The one or more forces may induce movement and/or rotation of lens holder 614 about an axis orthogonal or perpendicular to an optical axis defined by lens holder 614. For instance, the rotation of lens holder 614 may be about one of the x- and y-axes illustrated in FIG. 5C. Thus, said more generally, in one embodiment, one or more current signals to the second and/or third coils 632 and 634 may lead to tilting of lens holder 614 about axes orthogonal to the optical axis of lens holder 614. In one example, second and third coils 632 and 634 may be referred to as rotation coils. Such principles of operation may be useful for image stabilization-related functionality, among other things.

In one embodiment, coils, such as, for example, second and third coils 632 and 634 may be configured to facilitate rotation about an axis. For instance, second coil 632 may comprise at least a first and a second portion thereof, and an electromagnetic field induced on second coil 632 may be different as to the first and second portions of second coil 632. In one case, a first electromagnetic field of $X_1$ N/C may be induced at the first portion of second coil 632 while a second electromagnetic field of $X_2$ N/C may be induced at the second portion of second coil 632. Thus, for example, an attractive force may be induced at the first portion and a repulsive force may be induced at the second portion of second coil 632. The preceding discussion may also apply to third coil 632 as well. Of course, the preceding is offered to illustrate basic functionality, and is not intended to be taken in a restrictive sense. Indeed, limitless numbers of different embodiments are contemplated by the principles of the present disclosure.

In one embodiment, independent current signals may be transmitted to first, second, and/or third coils 630, 632, and 634. In one case, the independent current signals may be transmitted concurrently, partially concurrently, or at different times. Speaking broadly in terms of possible functionality, one example result of this principle is that, for example, autofocus functionality of lens holder 614 may operate independently as to image stabilization functionality of lens holder 614. Thus, for example, lens holder 614 may be capable of moving along an optical axis, while also rotating around at least one axis orthogonal to the optical axis. In this example, imaging module 602 may take advantage of autofocus functionality while concurrently or partially concurrently taking advantage of image stabilization functionality. It should be noted that, as one of ordinary skill in the art would appreciate, this is but one result of the preceding principles of operation.

Further, one or more springs may be connected to lens holder 614 and capable of returning lens holder 614 to a neutral and/or resting position as desired. For example, in one embodiment, one or more current signals may be applied to first coil 630 and may induce movement of lens holder 614 along the optical axis. At a point in time in which an image has been captured, lens holder 614 may be returned to a resting position via a spring or other mechanical and/or electromechanical mechanism.

Figures 7A, 7B:
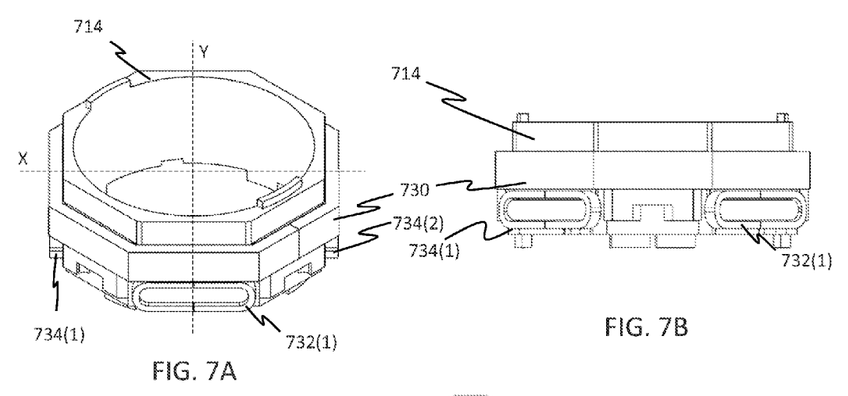
FIG. 7A is a perspective view of a lens holder.
FIG. 7B is a side view of a lens holder.

FIGS. 7A-7E illustrate various components and views of one embodiment of an imaging module 702. For instance, FIGS. 7A and 7B are perspective and profile views, respectively, of a lens holder 714. Lens holder 714 may comprise an electromagnetic actuator comprising a first coil 730 attached to a surface of lens holder 714. Lens holder 714 may also comprise at least a second coil set 732 comprising coils 732(1) and 732(2) and at least a third coil set 734 comprising coils 734(1) and 734(2). For instance, second coil set 732 may comprise a first coil 732(1) at a first position on lens holder 714 and a second coil 732(2) at a second position on lens holder 714. Coils 732(1) and 732(2) may be arranged on lens holder so as to be on complementary sides of lens holder 714. For instance, coils 732(1) and 732(2) may be arranged on an axis, such as the y-axis illustrated in FIG. 7A, so as to be on opposite sides of lens holder 714. Likewise, third coil set 734 may comprise coils 734(1) and 734(2), which may also be arranged on complementary sides of lens holder 714.

Figure 7C:
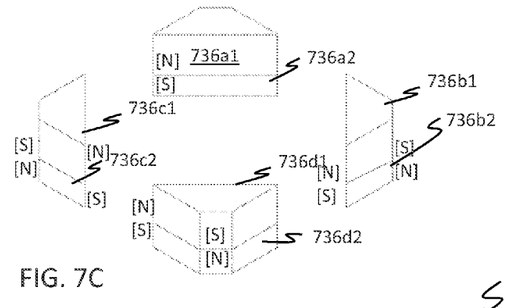
FIG. 7C is a perspective view of a plurality of magnets.
Figure 7D:
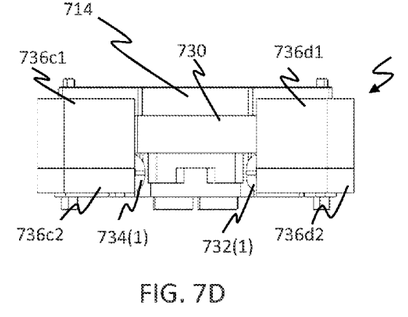
FIGS. 7D and 7E illustrate a lens holder and a plurality of magnets according to one embodiment.
Figure 7E:
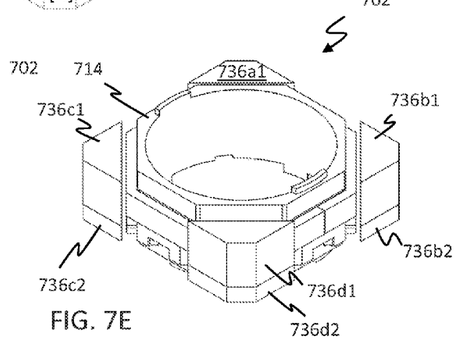

The electromagnetic actuator of imaging module 702 may also comprise a plurality of magnets as illustrated in FIGS. 7C-7E. FIG. 7C illustrates one possible arrangement of magnets according to one embodiment. For instance, imaging module 702 may comprise a plurality of magnets arranged in proximity to the coils, such as first coil 730 and second coil set 732. In one embodiment, the magnets of imaging module 702 may comprise magnets 736a, 736b1, 736c, and 736d1 arranged in proximity to first coil 730. In one embodiment, magnets 736a2 and 736d2 may be arranged in proximity to second coil set 732, and magnets 736b2 and 736c2 may be arranged in proximity to third coil set 734. Thus, lens holder 714 may be configured such that the combination of coils 732(1) and 732(2) and magnets 736a2 and 736d2 may be capable of inducing rotation of lens holder 714 about the x-axis illustrated in FIG. 7A. Further, lens holder 714 may be configured such that combination of coils 734(1) and 734(2) and magnets 736b2 and 736c2 may be capable of inducing rotation of lens holder 714 about the y-axis illustrated in FIG. 7A. For illustrative purposes, FIG. 7C also includes either an [N] or [S] indicator to suggest a polarity of a surface of a magnet. For instance, as shown in FIG. 7C, a surface of magnet 736*a*1 may have a polarity [N] and a surface of magnet 736*a*2 may have a polarity [S]. Surfaces of magnets 736*d*1 and 736*d*2 facing magnets 736*a*1 and 736*a*2 may also have a polarity of [N] and [S], respectively. While an opposite surface of magnets 736*d*1 and 736*d*2 may have an opposite polarity of [S] and [N], respectively. Of course, any combination of magnets and coils of an electromagnetic actuator are contemplated by the present disclosure and the preceding discussion of possible structure and arrangement are not to be taken in a restrictive sense.

In operation, imaging module 702 may receive a signal related to changing a focal length or focal ratio of imaging module 702. For example, the received signal may be related to increasing or decreasing a focal length or focal ration by moving a lens assembly with relation to an image sensor (not shown). In this case, first coil 730 may receive one or more current signals. In response to the one or more current signals, an electromagnetic field may be induced about first coil 730, and the induced electromagnetic field may induce one or more forces acting between first coil 730 and at least one magnet, such as magnets 736*a*1, 736*b*1, 736*c*1, and 736*d*1. The one or more induced forces may comprise an attractive or a repulsive force. In response to the one or more induced forces, lens holder 714 may be propelled along an optical axis relative to an image sensor and/or the magnets of the electromagnetic actuator of lens holder 714.

Imaging module 702 may also receive one or more signals related to rotating lens holder 714 about one or more axes orthogonal to the optical axis. For example, the received one or more signals may be related to rotating lens holder 714 about the x- or y-axis illustrated in FIG. 7A. In one embodiment, one or more current signals may be received at second or third coil sets 732 and 734. For example, if the received one or more signals are related to rotating lens holder 714 about the y-axis, then coils 734(1) and 734(2) may receive one or more current signals and induce one or more forces. The induced one or more forces may comprise an attractive or a repulsive force, among other things. For instance, coil 734(1) may receive one or more current signals that may induce a downward force related to an interaction of a magnetic field between magnet 736*c*1 and magnet 736*c*2, while coil 734(2) may receive one or more current signals that may induce a upward force related to an interaction of a magnetic field between magnet 736*b*1 and magnet 736*b*2. Thus, a combination of induced forces may be such that lens holder 714 rotates about the y-axis. As one of ordinary skill in the art would appreciate, similar operation may be achieved around other axes, such as the x-axis. Indeed, rotation of lens holder 714 about the x-axis may be achieved by providing one or more current signals to coils 732(1) and 732(2).

In one embodiment, similar functionality may be achieved by providing current signals to only one of the coils in a given coil set, such as, for example, coils 732(1) and 732(2). For example, lens holder 714 may be configured such that to achieve rotation about an axis, such as the x-axis in FIG. 7A, one or more current signals may be transmitted to one of, for example, 732(1) and 732(2). In this case, the transmitted one or more current signals may induce a force sufficient to induce rotation about the x-axis. In one example of such operation, one or more current signals may be received by coil 732(1) and may induce one or more forces, which may be sufficient to induce rotation about the x-axis. Of course, the preceding discussion is intended to illustrate general principles of operation and is not intended to be understood in a restrictive sense.

Figure 8A:
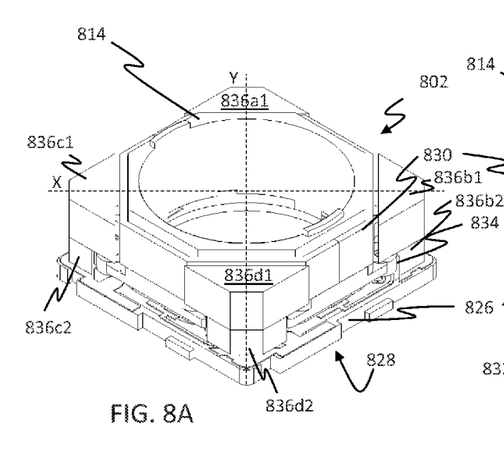
FIG. 8A is a perspective view of a lens holder and a plurality of magnets according to an embodiment.
Figure 8B:
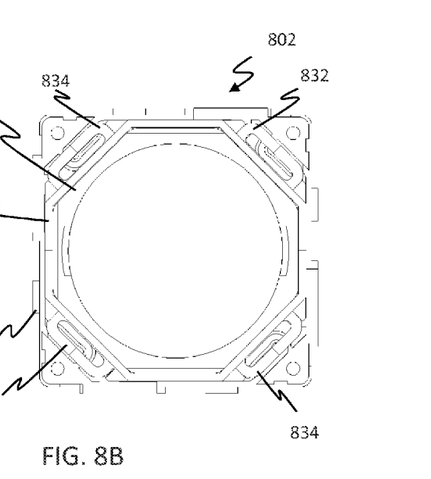
FIG. 8B is a top-down view of a lens holder according to one embodiment.

FIGS. 8A-8B illustrate yet another embodiment of the present disclosure. Indeed, FIGS. 8A and 8B show an imaging module 802 comprising a lens holder 814, a first coil 830, second coils 832, and third coils 834. Imaging module 802 may also comprise a plurality of magnets such as magnets 836*a*1-836*d*2. In one embodiment, magnets 836*a*2-836*d*2 may comprise different dimensions than magnets 836*a*1-836*d*1. The difference in dimensions may be such as to receive one or more magnets like second magnets 832 and third magnets 834. Second coils 832 and third coils 834 may be placed at the bottom of lens holder 814. Second and third coils 832 and 834 may define one or more planes perpendicular to the optical axis. Second coils 832 and third coils 834 may be partially arranged under magnets 836*a*1-836*d*1 and adjacent to the polar surface of magnet 836*a*1-836*a*2.

In operation, one or more current signals may be transmitted to coils of an electromagnetic actuator in order to induce movement of lens holder 814. For instance, as discussed above, one or more current signals to first coil 830 may induce one or more electromagnetic forces and propel lens holder 814 along an optical axis. Further, one or more current signals may be received by second coils 832 and may induce rotational movement of lens holder 814 about an axis orthogonal to the optical axis, such as, for example, the x-axis illustrated in FIG. 8A. One or more current signals may also be received by third coils 834 and may induce rotational movement of lens holder 814 about, for example, the y-axis illustrated in FIG. 8A.

Figures 8C, 8D:
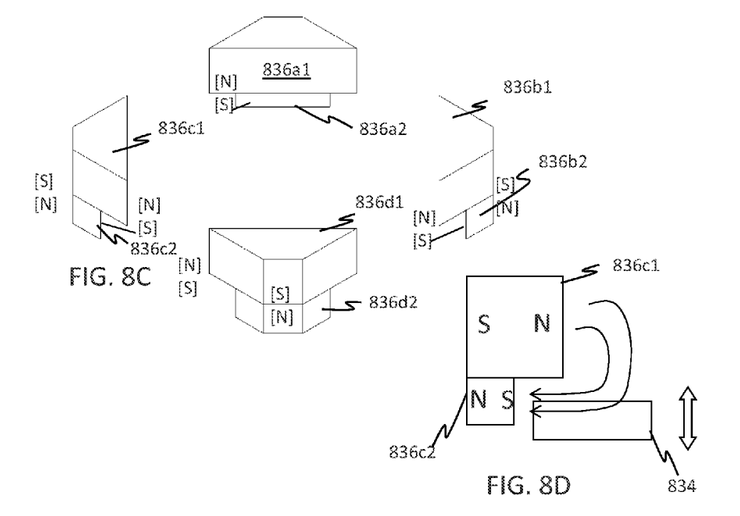
FIG. 8C is a perspective view of a plurality of magnets according to one embodiment.
FIG. 8D is a side view of a plurality of magnets and a coil according to an embodiment.

FIGS. 8C and 8D show an interaction of third coils 834 relative to a magnet field between the magnet 836*c*1 and magnet 836*c*2. Similar to FIG. 7C, FIG. 8C includes illustrative polarity representations of [N] and [S]. Imaging module 802 may also receive one or more signals related to rotating lens holder 814 about one or more axes orthogonal to the optical axis. For example, the received one or more signals may be related to rotating lens holder 814 about the x- or y-axis illustrated in FIG. 8A. In one embodiment, one or more current signals may be received at second and/or third coil sets 832 and 834. For example, if the received one or more signals are related to rotating lens holder 814 about the y-axis, then third coils 834 may receive one or more current pulses and induce one or more forces. For instance, one of third coils 834 may receive one or more current signals that may induce a downward force, which downward force may be related to an interaction of an electromagnetic field of third coils 834 and a magnetic field between magnets 836*c*1 and 836*c*2. Also, for instance, one of third coils 834 may receive one or more current signals that may induce an upward force, which upward force may be related to an interaction of an electromagnetic field of third coils 834 and a magnetic field between magnets 836*b*1 and 836*b*2. Thus, a combination of induced forces may be sufficient to induce rotation of lens holder 814 about the y-axis. As one of ordinary skill in the art would appreciate, similar operation may be achieved around other axes, such as the x-axis. Indeed, rotation of lens holder 814 about the x-axis may be achieved by providing one or more current signals to second coils 832.

Figures 9A, 9B, 9C:
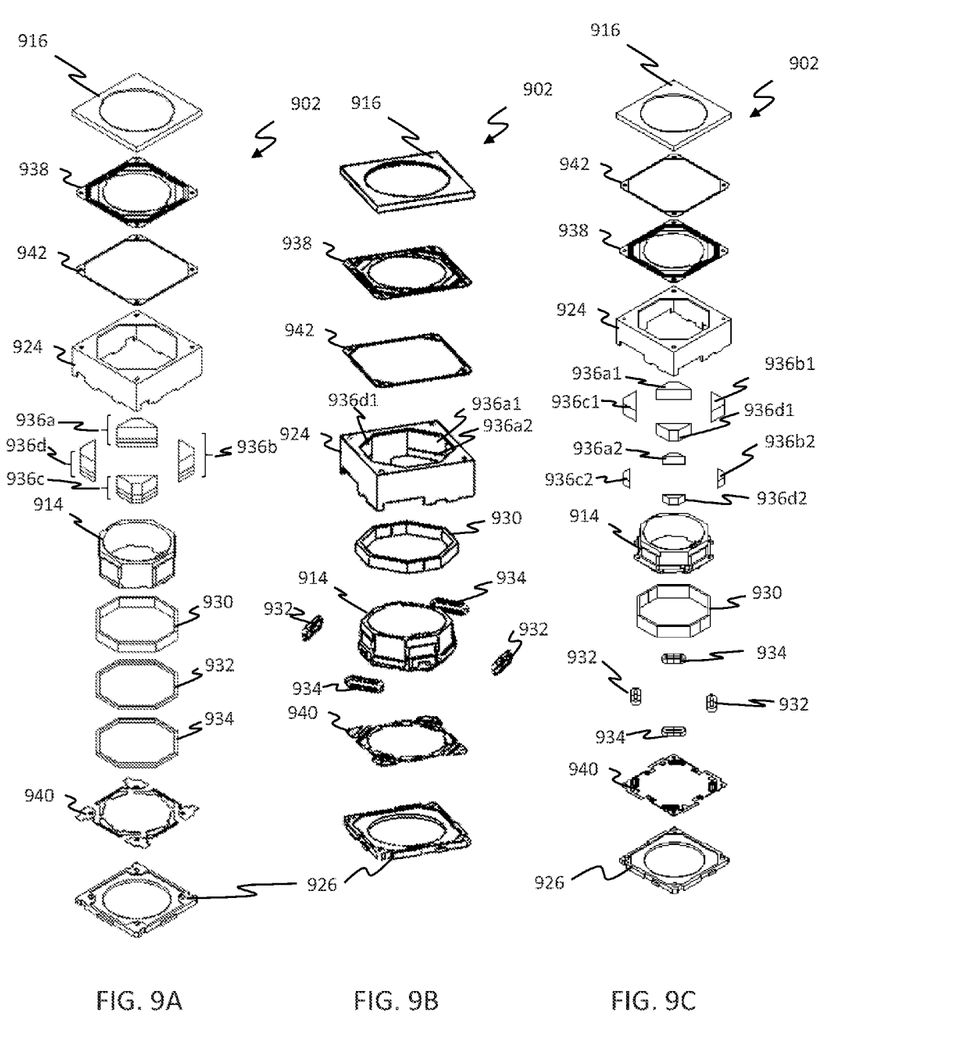
FIGS. 9A-9C illustrates portions of different embodiments of an imaging module.

FIGS. 9A-9C illustrate different embodiments of imaging modules 902. Referring to FIGS. 9A-9C together, an imaging module 902 may comprise an upper casing connected to a spacer 942 and/or an upper spring 938. The spacer 942 and upper spring 938 may be connected to a yoke 924 and/or a lens holder 914. A plurality of magnets may be connected to yoke 924. For instance, magnets 936a, 936b, 936c, and 936d shown in FIG. 9A may be arranged on an interior surface of yoke 924. In another embodiment, magnets 936a1-936d2 may be arranged on an interior surface of yoke 924. Lens holder 914 may be arranged within out casing 924 such that a plurality of coils attached to lens holder 914 are in proximity with the magnets in the yoke 924. For example, in one embodiment, first coil 930, second coil 932, and third coil 934 may be arranged in concentric circles (or other suitable shapes, such as hexagons and octagons, among other things) around an outer surface of lens holder 914, as shown in FIG. 9A. In another embodiment, second coils 932 and 934 may be connected to lens holder 914 and arranged in proximity to magnets, for instance, 936a1-936d2 connected to an interior surface of yoke 924, as shown in FIG. 9B. Lens holder 914 may be connected to a lower spring 940 and a base 926.

In one embodiment, each of upper and lower springs 938 and 940 may be symmetric about one or more bisecting axes. The symmetry of upper and lower springs 938 and 940 may affect the position of the rotation center which may affect the tilting motion of lens holder 914. For example, the symmetry of the springs may assist in keeping the rotation center generally along the optical axis and minimizing and/or limiting translation motion of lens holder 914.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
    a lens holder; and
    an electromagnetic actuator connected to the lens holder, the electromagnetic actuator comprising:
        a plurality of magnets;
        a first coil connected to the lens holder in proximity to at least a first magnet of the plurality of magnets and capable of inducing movement of the lens holder along an optical axis of the lens holder;
        a second coil connected to the lens holder in proximity to at least a second magnet of the plurality of magnets and capable of inducing rotation of the lens holder about a first axis perpendicular to the optical axis; and
        a third coil connected to the lens holder in proximity to at least a third magnet of the plurality of magnets and capable of inducing rotation of the lens holder about a second axis perpendicular to the optical and the first axes;
    wherein at least one of the plurality of magnets has a size that is different from that of at least a second of the plurality of magnets, and the first, second, and third coils each have a respective center and are arranged such that the center of each of the first, second, and third coils is arranged to lie along the optical axis of the lens holder to form a concentric stack of the first, second, and third coils around the lens holder;
    wherein the at least the first, second, and third magnets of the plurality of magnets are arranged in a vertical stack; and
    wherein the plurality of magnets comprises: (i) a set of at least two magnets arranged in proximity to the first coil and having a same polarity, (ii) a set of at least two magnets arranged in proximity to the second coil and having a polarity different from the polarity of the at least two magnets arranged in proximity to the first coil, and (iii) a set of at least two magnets arranged in proximity to the third coil and having a polarity different from the polarity of at least one of the other sets of magnets.

2. The apparatus of claim 1 wherein the first, second, and third magnets are fixably connected to a yoke.

3. The apparatus of claim 2 further comprising:
    a base connected to the lens holder via a lower spring, the base also connected to the yoke; and
    an upper casing coupled to the lens holder via an upper spring;
    wherein all the coils are located between the lower and upper spring.

4. The apparatus of claim 1 further comprising a controller capable of providing movement and rotation control for the lens holder.

5. An apparatus comprising:
    a lens holder; and
    an electromagnetic actuator connected to the lens holder, the electromagnetic actuator comprising:
        a plurality of magnets;
        a first coil connected to the lens holder in proximity to at least a first magnet of the plurality of magnets and capable of inducing movement of the lens holder along an optical axis of the lens holder;
        a second coil connected to the lens holder in proximity to at least a second magnet of the plurality of magnets and capable of inducing rotation of the lens holder about a first axis perpendicular to the optical axis; and
        a third coil connected to the lens holder in proximity to at least a third magnet of the plurality of magnets and capable of inducing rotation of the lens holder about a second axis perpendicular to the optical and the first axes;
    wherein at least one of the plurality of magnets has a size that is different from that of at least a second of the plurality of magnets, and the first, second, and third coils each have a respective center and are arranged such that the center of each of the first, second, and third coils is arranged to lie along the optical axis of the lens holder to form a concentric stack of the first, second, and third coils around the lens holder;

wherein the at least the first, second, and third magnets of the plurality of magnets are arranged in a vertical stack;

wherein the plurality of magnets comprises: (i) a set of four magnets arranged in proximity to the first coil, (ii) a set of two magnets arranged in proximity to the second coil, and (iii) a magnet arranged in proximity to the third coil; and wherein the set of four magnets has a first polarity, the set of two magnets has a second polarity, and the magnet arranged in proximity to the third coil has the first polarity.

6. A method comprising:

providing a current to a first coil, the first coil being in proximity to a first magnet of a plurality of magnets arranged around an exterior surface of a lens holder, to induce movement of the lens holder along an optical axis of the lens holder;

providing a current to a second coil, the second coil being in proximity to a second magnet of the plurality of magnets and connected to the lens holder, to induce rotation of the lens holder about a first axis perpendicular to the optical axis; and providing a current to a third coil, the third coil being in proximity to a third magnet of the plurality of magnets and connected to the lens holder, to induce rotation of the lens holder about a second axis perpendicular to the first and the optical axes;

wherein the first, second and third coils each have a respective center and are arranged such that the center of each of the first, second, and third coils is arranged to lie along the optical axis of the lens holder to form a concentric stack of the first, second, and third coils around the lens holder;

wherein at least the first, second, and third magnets of the plurality of magnets are arranged in a vertical stack;

wherein the plurality of magnets comprises: (i) a set of four magnets arranged in proximity to the first coil, (ii) a set of two magnets arranged in proximity to the second coil, and (iii) a magnet arranged in proximity to the third coil; and wherein the set of four magnets has a first polarity, the set of two magnets has a second polarity, and the magnet arranged in proximity to the third coil has the first polarity.

7. The method of claim 6 wherein the current received at the first coil is related to autofocus functionality.

8. The method of claim 6 wherein the current received at the second coil is related to image stabilization functionality.

9. The method of claim 6 wherein the current received at the first coil induces an electromagnetic force between the first coil and at least a first magnet arranged in proximity to the first coil.

10. The method of claim 6 wherein the current received at the second coil induces an electromagnetic field that induces an electromagnetic force between the second coil and at least a second magnet arranged in proximity to the second coil.

11. The method of claim 6 wherein the current received at the first coil is independent of the current received at the second and third coils.

12. The method of claim 11 wherein the current received at the second coil is independent of the current received at the third coil.

13. A device comprising:

a lens holder; and an electromagnetic actuator comprising:

a first coil connected to the lens holder to induce movement of the lens holder along an optical axis of the lens holder;

a second coil connected to the lens holder to induce rotation of the lens holder about a first axis orthogonal to the optical axis; and a third coil connected to the lens holder to induce rotation of the lens holder about a second axis orthogonal to the optical axis;

wherein the first, second, and third coils each have a respective center and are arranged such that the center of each of the first, second, and third coils is arranged to lie along the optical axis of the lens holder to form a concentric stack of the first, second, and third coils around the lens holder;

wherein the electromagnetic actuator further comprises a plurality of magnets, at least a first, a second, and a third magnet of the plurality of magnets being arranged in a vertical stack in proximity to the first, second and third coils; and wherein the plurality of magnets comprises: (i) a set of at least two magnets arranged in proximity to the first coil and having a same polarity, (ii) a set of at least two magnets arranged in proximity to the second coil and having a polarity different from the polarity of the at least two magnets arranged in proximity to the first coil, and (iii) a set of at least two magnets arranged in proximity to the third coil and having a polarity different from the polarity of at least one of the other sets of magnets.

14. The device of claim 13 wherein the electromagnetic actuator is capable of (i) pulsing a current to the first coil independent of the second and third coils, and (ii) pulsing a current to the second coil independent of the third coil.

15. The device of claim 13 further comprising a controller capable of providing movement and rotation control for the lens holder and the electromagnetic actuator.

* * * * *